C. W. TRIPPENSEE.
PISTON RING.
APPLICATION FILED MAR. 5, 1921.

1,419,781.

Patented June 13, 1922.

Christ. W. Trippensee
INVENTOR

BY Victor J. Evans
ATTORNEY

WITNESS:
Geo Ackman Jr

UNITED STATES PATENT OFFICE.

CHRIST. W. TRIPPENSEE, OF JEFFERSON CITY, MISSOURI.

PISTON RING 1,419,781.  Specification of Letters Patent.  Patented June 13, 1922.

Application filed March 5, 1921. Serial No. 449,694.

*To all whom it may concern:*

Be it known that I, CHRIST. W. TRIPPENSEE, a citizen of the United States, residing at Jefferson City, in the county of Cole and State of Missouri, have invented new and useful Improvements in Piston Rings, of which the following is a specification.

This invention relates to packing rings for use in engines, pumps of various kind, and in fact all devices in which piston rings are necessary, and has for its object the provision of a piston ring formed of two similar sections which are superposed and which are provided with means whereby relative rotation of the ring sections is prevented, the advantage being that the sections will always lap joints so as to prevent leakage of compression from or oil into the explosion chamber, this of course improving the running of the engine generally as well as preventing fouling of the spark plugs.

An important and more specific object is the provision of a two-piece ring of this character in which each section carries a lug disposed between the ends of the other section, each lug having inclined sides and the adjacent ends of the other section being likewise inclined.

Another object is the provision of a ring of this character which is so constructed that the pressure or tension thereof will be evenly distributed throughout the entire circumference so that uniform wear will be insured which will prevent the cylinders from being worn into an oval or elliptical cross section as so often occurs in the use of the ordinary ring.

An additional object is the provision of a ring which will be simple and inexpensive in manufacture, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
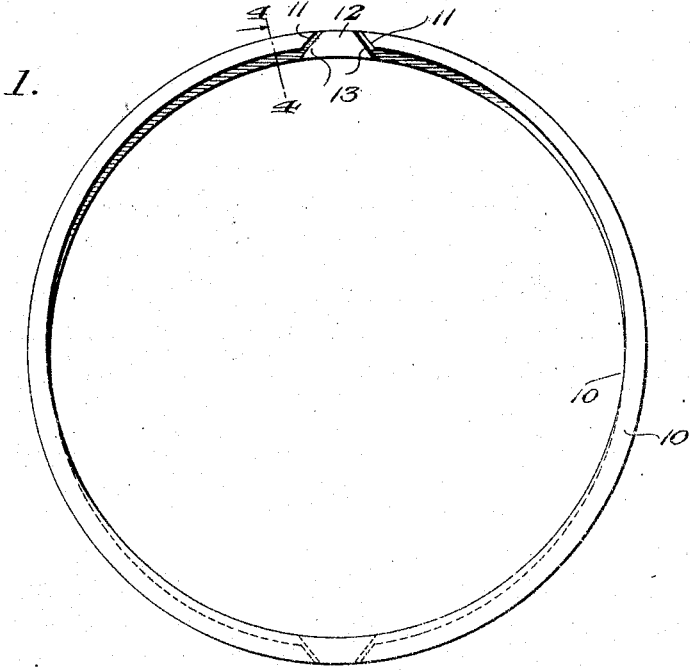
Figure 1 is a plan view of my ring assembled.
Figure 2:
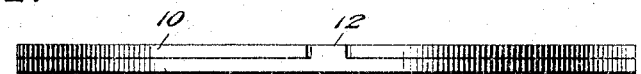
Figure 2 is an edge view looking at one of the lugs.
Figure 3:
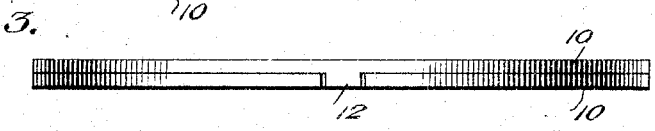
Figure 3 is an edge view looking at the diagrammatically opposite side.
Figure 4:
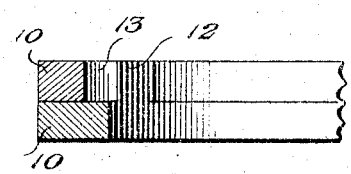
Figure 4 is a cross sectional view taken near one of the lugs.

Referring more particularly to the drawings, I have shown my ring as formed of two sections which are identical and each section includes or is formed as a split ring body 10 which is of uniform thickness but which has its greatest width at the point diametrically opposite the split. The ends at the split are inclined, as shown at 11. Formed integrally at the widest part of each section, that is at the point diametrically opposite the split, is an integral lug 12 designed to fit between the ends at the split of the other section and this lug has inclined ends 13 adapted to conformingly engage, or at least substantially engage, the inclined ends of the split.

In the use of the ring the sections are superposed with the lug of each disposed within the split of the other, after which the assembled ring is placed in position in the ordinary manner. The ring is of course used in the same manner as any other ring but will be far more efficient in operation and service as the assembled rings are of uniform diameter and thickness as well as cross sectional configuration. The disposition of the lugs within the splits of course prevents relative rotation of the sections and thereby positively eliminates any danger of the splits ever coming in registration. In this way it will be seen that leakage of compression from the explosion chamber or leakage of oil into the explosion chamber will be prevented.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A piston ring formed of a pair of superposed eccentric sections of identical construction, each section being of uniform thickness and split with its narrowest portion at the split and its widest portion diametrically opposite the split, the ends of each section at the split being inclined in opposite direction, a lug formed integrally upon each section fitting within the split of the other section and having its ends inclined at substantially the same angle as the ends at the split.

2. A piston ring formed of a pair of eccentric sections of identical construction arranged in superposed relation with the wider portion of one section disposed upon the narrower portion of the other section, each section being of uniform thickness and split at its narrowest portion, the ends of each section at the split being inclined in outwardly converging relation, and a lug formed integrally upon each section fitting within the split of the other section and having its ends converging outwardly at substantially the same angle as the inclined ends of the split.

In testimony whereof I affix my signature

CHRIST. W. TRIPPENSEE.